United States Patent [19]

Romey

[11] 3,915,906

[45] Oct. 28, 1975

[54] PROCESSES FOR THE PRODUCTION OF GASKET MATERIALS FROM COAL

[75] Inventor: Ingo Romey, Essen, Germany

[73] Assignee: Bergwerksverband GmbH, Essen, Germany

[22] Filed: Apr. 2, 1973

[21] Appl. No.: 347,344

[30] Foreign Application Priority Data

Apr. 1, 1972  Germany............................ 2216105

[52] U.S. Cl. ............... 260/3; 106/307; 215/DIG. 2; 260/4 R; 260/31.8 M; 260/42.1 T; 260/42.18; 260/42.25; 260/857 UN; 260/859 R; 260/859 PV; 260/889; 260/890

[51] Int. Cl.².... C08L 7/00; C08K 5/10; C08K 3/04

[58] Field of Search ............ 106/307; 260/889, 890, 260/42.25, 31.8 M, 3, 4 R, 42.17, 42.18; 215/DIG. 2

[56] References Cited

UNITED STATES PATENTS

| | | | |
|---|---|---|---|
| 2,638,456 | 5/1953 | Laning | 260/41.5 R |
| 2,640,787 | 6/1953 | Greaves et al. | 264/65 |
| 3,359,229 | 12/1967 | Chalex | 136/166 |
| 3,400,096 | 9/1968 | Bateman et al. | 260/42.25 |
| 3,404,120 | 10/1968 | Gotshall | 260/42.25 |
| 3,452,120 | 6/1969 | Arnold | 260/889 |
| 3,563,402 | 2/1971 | Arnold | 260/890 |

OTHER PUBLICATIONS

Whitby–Synthetic Rubber, (Wiley) (N.Y.) (1954), pp. 670–672.
Condensed Chem. Dictionary, (5th Ed.) (Reinhold) (N.Y.) (1956), p. 115.

*Primary Examiner*—M. J. Welsh
*Assistant Examiner*—H. H. Fletcher
*Attorney, Agent, or Firm*—Michael S. Striker

[57] ABSTRACT

Gasket materials in the form of shaped forms such as discs, tubes, rings, or sheets are produced by mixing comminuted coal together with between 10 and 30% by weight of a comminuted elastomeric polymer, a thermoplastic polymer resin, and optionally, a fibrous material, and molding the mixture at a temperature between 100° and 250°C.

13 Claims, No Drawings

PROCESSES FOR THE PRODUCTION OF GASKET MATERIALS FROM COAL

BACKGROUND OF THE INVENTION

The use of asbestos, leather, cork, plant fibers, rubber and synthetic resins, as well as graphite and synthetic carbonaceous materials as gasket materials for various purposes, is known. The known materials have nevertheless the disadvantage that they either are workable only with difficulty such as, for example, cork, plant fibers, and graphite, or tend to flow after being subjected for long periods to pressure such as, for example, rubber and synthetic resins. Gasket materials prepared from mixtures of various substances such as, for example, papers impregnated with synthetic resins, mixtures of rubber and asbestos, or synthetic resins with textile fibers or cloths embedded therein, have better properties than the foregoing as gasket materials but these gasket materials also have limitations with respect to the pressures and temperatures at which they can be used. Other known gasket materials include those composed of rubber or synthetic resins to which between 25 and 60% of fillers or loading materials such as, for example, soot, lampblack, graphite, or stone dust, have been added. Even though gasket materials containing such fillers are inherently stable, which increases the loading capacity of the gasket material, the specific properties of the base material will nonetheless remain unchanged.

BRIEF SUMMARY OF THE INVENTION

The object of the present invention is to produce a gasket material that is substantially improved over the known gasket materials. This is accomplished by the use of pulverized coal as an essential component of the composition. In accordance with the present invention, the production of the gasket materials proceeds in such a manner that coal together with between approximately 10 and 30% by weight of an elastomer in the form of a powder, emulsion, or solution, are intimately mixed, and this mixture is then shaped or molded at a temperature between 100° and 250°C. The coal will preliminarily be ground or comminuted into particles having a size smaller than 200 microns.

DETAILED DESCRIPTION OF THE INVENTION

For the production of the gasket material of the present invention the following elastomers are suitable: natural rubber, polyisoprene rubber, neoprene (polychloroprene) rubber, polybutadiene and copolymers thereof and, if required, admixtures of these elastomers with polystyrene and polyacrylonitrile resins. These elastomers are distributed as homogeneously as possible in the finely powdered coal. Moreover, the elastomers, assuming they are already in powdered form ready for use and also have a particle size under 200 microns, are homogeneously mixed at prevailing room temperature with the powdered coal. The elastomers can alternatively be added to the powdered coal in the form of solutions and emulsions. Emulsions of the elastomers are especially suitable for all natural and synthetic rubbers which are obtained in the form of a latex. The solvent or the water that is included in the emulsion will be expelled by heating the mixture.

The resulting mixture can then be shaped or molded in any conventional press such as a die or extrusion press, or in an extrusion or injection molding machine. The mixture is then subjected in these machines or presses to a relatively low temperature between approximately 100° and 250°C. It is desirable to relieve the pressure momentarily during the compression step to release any gases that may be liberated during the compression step.

The strength of the gasket materials of the present invention may be improved generally by including in the initial mixture of coal and elastomer between 1 and 10% by weight of a thermoplastic resin such as, for example, nylon, Perlon (a polyamide similar to nylon), polyethylene, polypropylene, polyvinyl chloride, polytetrafluorethylene, and polyurethane resins, and copolymers thereof. These thermoplastic resins in powdered form, preferably in the form of granules having a particle size below 200 microns, can be mixed with the powdered coal; they can, however, also be added to the coal in the form of solutions or emulsions. In such cases, it is likewise desirable to expel all or the greater portion of the solvent or water that is included in the emulsion from the mixture before it is molded.

The extrusion or compression of the mixture can generally be facilitated by the addition of known plasticizers in amounts between 2 and 7%, and preferably between 4 and 5%, computed on the basis of the weight of the coal that is present in the mixture. Suitable plasticizers are, for example, dinonyl phthalate, dibutyl phthalate, dioctyl phthalate, dimethylglycol phthalate, dibutylglycol phthalate, dicyclohexyl phthalate, benzylbutyl phthalate, benzyloctyl adipate, tributyl and trioctyl esters of trimellitic acid (1,2,4-benzenetricarboxylic acid), and the tetrabutyl and tetraoctyl esters of pyromellitic acid (1,2,4,5-benzenetetracarboxylic acid). Substantial increase of the bending strength of the gasket material produced in accordance with the processes of the present invention is obtainable when the initial mixture before molding also includes between 5 and 40% by weight of an inert fibrous material such as, for example, asbestos, glass wool, and carbonized filaments of organic polymers.

The mixtures of coal and elastomers with the other substances that may be included therein to form the gasket materials of the present invention can be molded in die presses, or in extrusion and injection molding machines in much the same manner as are other thermoplastic substances. The material should not have a shore hardness in excess of 60 as measured by a Shore scleroscope.

In the Tables which follow are listed the bending strengths of various gasket materials prepared in accordance with the processes of the present invention from the coals, elastomers, thermoplastic polymeric substances, and fibers that are specified, in the specified amounts in percentages by weight. Further examples of such gasket materials and processes of preparing the same are included in the Examples following the Table.

| Composition No. | Coal, Content of Volatiles, % by weight | Elastomer % by weight | Thermoplastic Polymer, % by weight | Fibrous Material, % by weight (based on weight of other components) | Bending Strength, kg./sq.cm. |
| --- | --- | --- | --- | --- | --- |
| 1 | 38 | 12 BAM (1) | 6 Polyethylene | 20 Asbestos | 390 |
| 2 | 25 | 20 BSM (2) | — | — | 180 |
| 3 | 25 | 15 BSM (2)(3) | 5 Polypropylene | — | 210 |
| 4 | 25 | 15 BSM (2) | 5 Polypropylene | — | 220 |

—Continued

| Composition No. | Coal, Content of Volatiles, % by weight | Elastomer % by weight | Thermoplastic Polymer, % by weight | Fibrous Material, % by weight (based on weight of other components) | Bending Strength, kg./sq.cm. |
|---|---|---|---|---|---|
| 5 | 25 | 15 BSM (2) | 5 Polypropylene | 15 Mineral Wool | 270 |
| 6 | 18 | 25 Neoprene | 5 Polyethylene | — | 210 |
| 7 | 18 | 22 Neoprene(3) | 8 Polyethylene | — | 220 |
| 8 | 18 | 22 Neoprene(3) | 8 Polyethylene | 35 Nylon | 330 |
| 9 | 6 | 20 Natural rubber | 7 Nylon | — | 170 |
| 10 | 6 | 20 Natural rubber | 7 Nylon | 5 Cotton | 230 |
| 11 | 42 | 10 Polyisoprene rubber | 6 Perlon | — | 220 |
| 12 | 42 | 10 Polyisoprene rubber (3) | 7 Perlon | — | 230 |
| 13 | 42 | 10 Polyisoprene rubber (4) | 7 Perlon | .5% Asbestos | 290 |

(1) Butadiene-acrylonitrile copolymer
(2) Butadiene-styrene copolymer
(3) Added in the form of a solution
(4) Added in the form of an emulsion

EXAMPLE 1

Seventy (70) parts by weight of a coal having a content of 18% of volatile components was ground to a particle size of less than 80 microns and mixed together with 20 parts by weight of a powdered butadiene-styrene copolymeric resin and 7 parts by weight of a polyethylene resin, and the mixing was continued until a flowable mixture of granules having an average particle size of approximately 1 millimeter was formed. The resulting granules were then placed into a heated extruder in which they were compressed and made plastic. The extruder included three heating zones having the following temperatures: inlet zone 120°C, middle zone 150°C, and nozzle tip 120°C. Depending upon the form of the nozzle tip, continuous round strands of different diameters or films or different thicknesses can be formed. By using a nozzle having a round orifice and a diameter of 6 millimeters, a very flexible round strand with a tensile strength of 0.9 kilogram per square millimeter and a compressive strength of 300 kilograms per square centimeter was obtained.

The thus-extruded round strand is eminently suitable for use as a gasket material for a pressure vessel containing quinoline at a pressure of up to 60 atmospheres gauge and a temperature up to 140°C. Gasket materials made of silicon rubber, Perbunan-N synthetic rubber (a copolymer of butadiene and acrylonitrile), and polyvinyl chloride resin, under the same conditions, were crushed or swelled excessively and consequently were not usable for the same purposes.

EXAMPLE 2

A flowable mixture of granules consisting of 72.5% by weight of bituminous coal having a content of 25% of volatile components, 17.5% by weight of neoprene, and 10% by weight of polyvinyl chloride resin was prepared as described in Example 1 and compressed into a disc in a heated hand die press. The cooled disc had a compressive strength of 950 kilograms per square centimeter and a bending strength of 290 kilograms per square centimeter. Such as plate-like gasket material is not affected by heat and can be used as a nonflowing flange gasket for long-term experiments.

EXAMPLE 3

Sixty-five parts by weight of a crude lignite transported from the Rhenish region was ground to a particle size smaller than 100 microns and then mixed and homogeneously kneaded together at an elevated temperature with 20 parts by weight of Perbunan-N synthetic rubber, 10 parts by weight of polyvinyl chloride resin (such as is available under the tradename Hostalit), and 5 parts by weight of a plasticizer such as dibutyl phthalate. The mixture was then extruded from a heated extruder as a film having a thickness of 0.2 millimeter.

The resulting film is suitable for use as a gasket material that is impermeable to water and steam for use, for example, in the construction industry as a steam or vapor barrier, a barrier material against ground water, or as a substitute for tar paper or similar roofing materials.

Inasmuch as the foregoing disclosure comprises preferred embodiments of the invention which were selected solely for purposes of illustration, it is to be understood that modifications and variations may be made therein without departing from the teachings hereinbefore, and that the invention is to be limited only by the scope of the appended claims.

We claim:

1. A process for the production of gasket materials from coal, comprising mixing comminuted coal particles with between substantially 1 and 10 percent by weight of thermoplastic resinous polymer and about 10 to 30 percent by weight, based on the weight of the resulting mixture, of an elastomer, the elastomer being in pulverized, emulsified or dissolved form; and molding the mixture at temperatures between about 100° and 250°C so as to obtain a gasket material, the elastomer in the gasket material being chemically unvulcanized so that the gasket material remains relatively soft and flexible for gasket applications.

2. A process as defined in claim 1 in which between 5 and 40% by weight of an inert fibrous material, based upon the weight of the coal in the said mixture, is added to the mixture during the mixing step.

3. A process as defined in claim 1 in which between 2 and 7% by weight of a plasticizer, based upon the weight of the coal, is added to the mixture during the mixing step.

4. A process as defined in claim 1 in which the mixture contains between 4 and 5% by weight of a plasticizer, based upon the weight of the coal.

5. A process as defined in claim 1 in which the mixture is prepared by mixing approximately 70 parts by weight of comminuted coal having a content of approximately 18% by weight of volatile components and a particle size below 80 microns, approximately 20 parts, of a pulverized copolymeric resin of butadiene and styrene, and approximately 7 parts by weight of a polyethylene resin, and in which the molding step is carried out by extrusion at a temperature between 130° and 150°C.

6. A gasket material produced in accordance with a process as defined in claim 1.

7. A process as defined in claim 1 in which the thermoplastic resinous polymer is added to the mixture in the form of particles having a size of less than substantially 200 microns.

8. A process as defined in claim 1 in which the thermoplastic resinous polymer is added to the mixture in pulverized, emulsified or dissolved form.

9. A process as defined in claim 1 in which the mixture is prepared by mixing approximately 72.5 percent by weight of pulverized bituminous coal, based on the weight of the mixture, approximately 17.5 percent by weight of neoprene synthetic rubber, based on the weight of the mixture and approximately 10 percent by weight of polyvinyl chloride, based on the weight of the mixture, the bituminous coal having a content of approximately 25 percent of volatile components, and the molding step comprising compression of the mixture to the form of a disc.

10. A process as defined in claim 1 in which the coal particles have a size of less than substantially 200 microns.

11. A process as defined in claim 1 in which the elastomer is in pulverized form and the particles of the elastomer have a size of less than substantially 200 microns.

12. A process as defined in claim 1 in which the pressure is relieved during the molding step to release liberated gases.

13. A process as defined in claim 1 in which the elastomer is in emulsified or dissolved form and the emulsifying agent or solvent is expelled by heating the mixture prior to the molding step.

* * * * *

Disclaimer 3,915,906.—*Ingo Romey*, Essen, Germany. PROCESSES FOR THE PRODUCTION OF GASKET MATERIALS FROM COAL. Patent dated Oct. 28, 1975. Disclaimer filed Jan. 19, 1978, by the assignee, *Bergwerksverband GmbH*.

Hereby enters this disclaimer to claims 1–13 of said patent.

[*Official Gazette May 16, 1978.*]